United States Patent
Kuusipalo et al.

(10) Patent No.: US 6,645,584 B1
(45) Date of Patent: Nov. 11, 2003

(54) COMPOSTABLE COATED PAPER OR PAPERBOARD, A METHOD FOR MANUFACTURING THE SAME AND PRODUCTS OBTAINED THEREOF

(75) Inventors: Jurkka Kuusipalo, Tampere (FI); Kimmo Nevalainen, Karhula (FI); Tapani Penttinen, Huutjärvi (FI)

(73) Assignee: ENSO Oyj (FI)

( * ) Notice: Subject to any disclaimer, the term of this patent is extended or adjusted under 35 U.S.C. 154(b) by 0 days.

(21) Appl. No.: 09/743,029

(22) PCT Filed: Jul. 6, 1999

(86) PCT No.: PCT/FI99/00597
§ 371 (c)(1),
(2), (4) Date: Feb. 2, 2001

(87) PCT Pub. No.: WO00/01530
PCT Pub. Date: Jan. 13, 2000

(30) Foreign Application Priority Data

Jul. 7, 1998 (FI) .................................................. 981558

(51) Int. Cl.[7] .......................... B32B 27/08; B32B 27/10; B32B 27/34; B32B 27/36; B32B 31/30
(52) U.S. Cl. ..................... 428/34.2; 428/35.7; 428/36.6; 428/219; 428/340; 428/341; 428/342; 428/347; 428/349; 428/480; 428/481; 428/537.5; 264/172.19; 264/173.16; 264/173.11; 264/173.12; 156/244.11
(58) Field of Search .................... 428/34.2, 35.7, 428/36.6, 480, 481, 537.5, 219, 311.11, 340, 341, 342, 347, 349; 264/172.19, 173.16, 173.11, 173.12; 156/244.11

(56) References Cited

U.S. PATENT DOCUMENTS

| | | | |
|---|---|---|---|
| 5,434,004 A | * | 7/1995 | Ajioka et al. ................ 428/395 |
| 5,446,079 A | | 8/1995 | Buchanan et al. |
| 5,556,711 A | * | 9/1996 | Ajioka et al. ............... 428/35.8 |
| 5,580,911 A | | 12/1996 | Buchanan et al. |
| 5,599,858 A | | 2/1997 | Buchanan et al. |
| 5,644,020 A | * | 7/1997 | Timmermann et al. ..... 528/288 |
| 5,661,193 A | | 8/1997 | Khemani |
| 5,849,374 A | * | 12/1998 | Gruber et al. .............. 428/212 |
| 5,849,401 A | * | 12/1998 | El-Afandi et al. ..... 156/244.11 |
| 6,183,814 B1 | * | 2/2001 | Nangeroni et al. ......... 427/361 |

FOREIGN PATENT DOCUMENTS

| | | |
|---|---|---|
| EP | 0 514 137 | 11/1992 |
| EP | 0 603 876 | 6/1994 |
| FI | 0099268 | 2/1998 |
| WO | WO 94/09210 | 4/1994 |
| WO | WO 96/31303 | 10/1996 |
| WO | WO 96/31347 | 10/1996 |
| WO | WO 96/33923 | 10/1996 |
| WO | WO 97/37848 | 10/1997 |
| WO | WO 98/09812 | 3/1998 |

OTHER PUBLICATIONS

Neste Corporate Technology, "Poly(Lactic Acid) Polymers", *Porvoon Offsetpaino Oy 1997.*

* cited by examiner

*Primary Examiner*—Vivian Chen
(74) *Attorney, Agent, or Firm*—Rothwell, Figg, Ernst & Manbeck PC

(57) ABSTRACT

The invention relates to compostable polymer coated paper or paperboard (1), a method for making the same and products obtained therefrom. According to the invention, a compostable biodegradable coating (3) of paper or paperboard (1) includes an outer layer (6) containing polylactide the weight of which is at the most about 20 g/m$^2$, and of an adhesive layer (7) that binds the outer layer to the paper or paperboard (1) and is of biodegradable polymer material that is coextruded with the polylactide. Suitable materials for the adhesive layer (7) are biodegradable polyesters. The production is by coextrusion of the polylactide layer (6) and the adhesive layer (7) on either one side of the paper or paperboard or on both sides thereof. Products obtained include in particular packages for food stuffs and disposable dishes such as containers for frozen foods, disposable drinking cups, heat-sealed carton packages and packaging wraps.

16 Claims, 2 Drawing Sheets

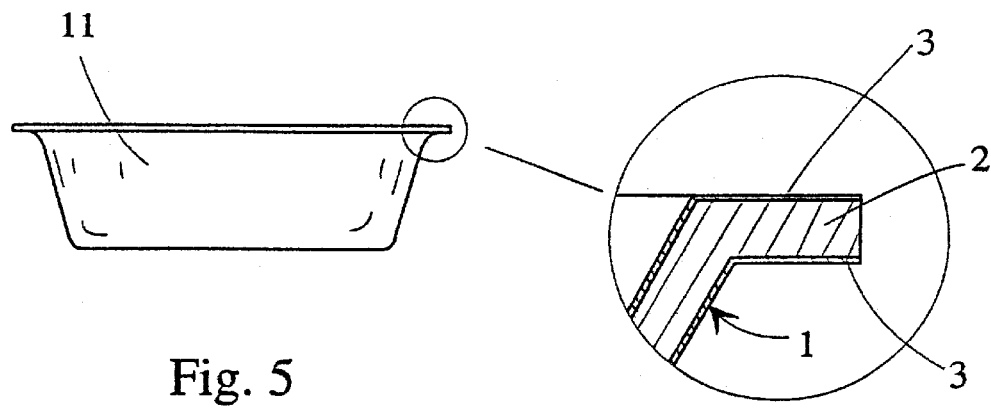
Fig. 5
Fig. 5a
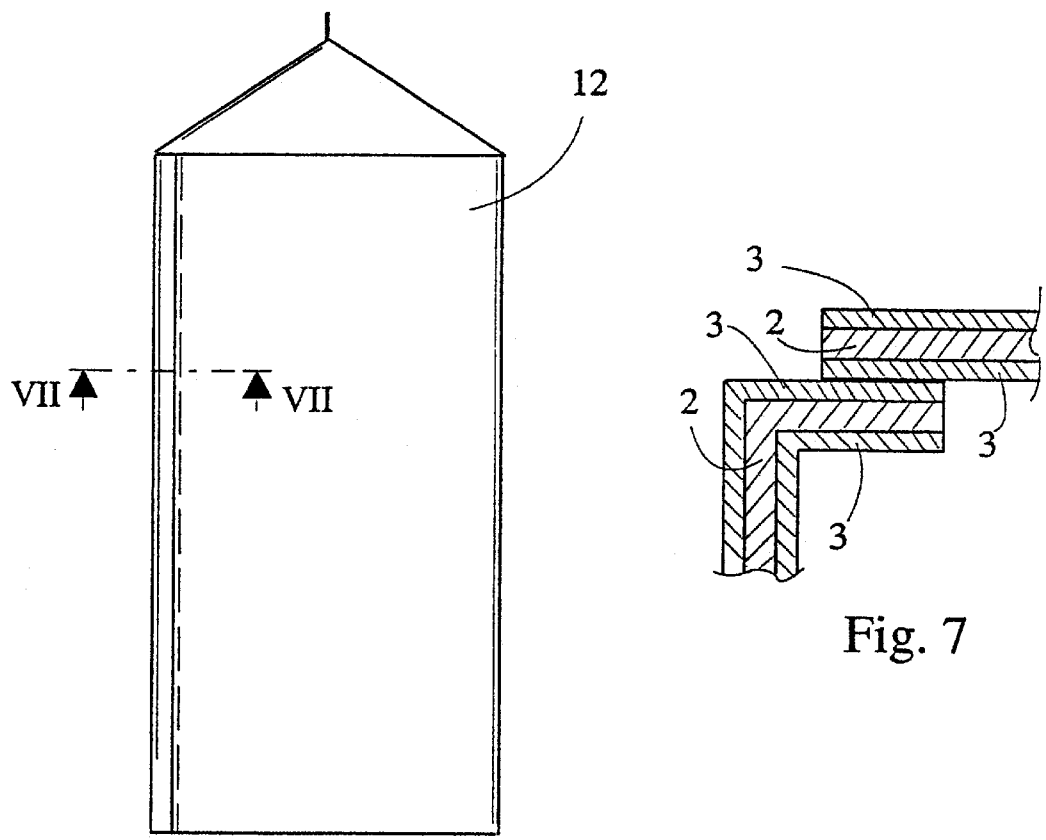
Fig. 6
Fig. 7

COMPOSTABLE COATED PAPER OR PAPERBOARD, A METHOD FOR MANUFACTURING THE SAME AND PRODUCTS OBTAINED THEREOF

The object of this invention is a compostable polymer coated paper or paperboard, in which the coating includes as one component polylactide. A further object of the invention is a method for producing the paper or paperboard in question as well as a number of products produced from the paper or paperboard.

Water-resistant polymer coated paper and paperboard are commonly used as packaging material for food stuffs and as disposable containers. Coating polymers and multilamellar coating structures including the same have been developed that give to the package a good oxygen, water vapour and aroma tightness in order to ascertain good preservation of the packaged product. Another demand of lately increasing importance set on polymer coated packaging materials in their biodegradability. However, these two objects cannot be reached with the same polymers because the efficient block polymers in use such as EVOH or polyamide are practically unbiodegradable where as in commercial biodegradable polymers the blocking properties have more or less been omitted. Examples of biodegradable polymers on the market are e.g. polyhydroxy butyrate, plastics based on starch and polylactide (PLA) the latter of which is preferred for its simple manufacture and for its relatively good blocking properties.

Use of polylactide as packaging material coating is known e.g. from FI Patent Application 951 637 that describes a grease resistant paper intended for food stuff packaging where polylactide is mentioned as one possible material for the biodegradable polymer coating. According to this publication, the coating on the paper may consist of one biodegradable polymer layer or of a layered structure of two, even three layers on top of one another where the different layers have their own functions. The object was to produce a packaging paper which were at the same time grease, aroma, gas and water vapour proof and biodegradable. However, the publication does not include practical examples of application with measuring data, also, the publication does not divulge the role of the biodegradable polylactide might have in a multilamellar coating.

A more specific description of the use of polylactide in a packaging material may be found in EP Application 0 514 137 which describes a polylactide coated biodegradable packaging paper or paperboard for packaging liquids. The paper or paperboard can first be coated with a biodegradable adhesion producing binder layer that may be glue, gelatine, casein or starch after which the polylactide layer is applied on top of the binder layer. However according to this publication, all paper types do not require use of binder. In the examples given in the publication the thickness of the polylactide layer is 25–30 $\mu$m, and the coating is described as transparent, glossy, moisture resistant and as having good mechanical strength. In the examples of application in this publication the biodegradability of the coating has been tested but not its barrier properties.

In the brochure called "Poly(Lactic Acid) Polymers" (1977) published by Neste Oy, the manufacturer of polylactide, polylactide in itself is brittle and stiff if plasticizers are not included. The polyractide film forms a good gas barrier for air but only a fair one for water vapour. The flexibility and strength improving plasticizers added may disturb the barrier properties of the polylactide. According to this information, polylactide is no comparison for the best biodegradable blocking polymers (EVOH) but however, as to its gas barrier properties, essentially better than e.g. the polyethylene commonly used and satisfactory for numerous container and packaging applications. According to this brochure polylactide may be extruded and heat sealed at 180–250° C.

Accruing to observations and experience of the inventors, when extruding polylactide directly on paper or paperboard one comes up against the problem that in order to attain sufficient adhesion, one must operate at the utmost allowed temperature, i.e. at about 250° C., where furthermore the layer applied must be relatively thick. In the temperature mentioned the melt strength of polylactide is weak and pin holes remain easily in the coating layer obtained. Furthermore, because of the high temperature the polylactide is at risk of degradation such that its average molecular weight and viscosity decrease which further increases the fragility of the layer and promotes pin hole formation. Due to the brittleness of polylactide the products produced of a paperboard coated therewith show leaks and cracks whereby the coating does not withstand the creasing or bending and extending according to form inherent in producing plate or mould form products. Even in heat sealing polylactide layers cracking diminishing the tightness of seals is encountered.

Even dilution of coatings is included in developing trends of polymer coated packaging material, whereby e.g. LD polyethylene has been used with good results. As already mentioned, polylactide can be made to adhere to paper or paperboard only as a relatively thick layer, corresponding to what is described in EP Patent Application 0 514 137. With thinner layers the adhesion to the paper or paperboard surface is insufficient where in addition hindering of pin hole formation becomes all the more difficult.

However, decreasing the polylactide content would be desirable even because of the costs involved in using this material.

Still a further significant problem encountered with polylactide coatings is tearing of the edges of the coated film and polymer flakes loosening therefrom which when spilling to the newly applied polymer coating cause irregularities of the coating and clogging of the process. The high processing temperatures of polylactide promote "bearding" of the mouth piece of the extruder due to which the former must be cleansed and production ceased.

The purpose of the invention at hand is to come up with a solution by which the polylactide content in the paper or paperboard polymer coating can be diminished when, at the same time, the other inconveniences encountered with polylactide coatings described above can essentially be avoided. The polymer coated paper or paperboard according to invention is characterized in that the coating comprises an outer layer containing polylactide which weights at most about 20 g/cm$^3$ plus an adhesive layer binding the outer layer to the paper or paperboard which consists of a polylactide co-extrudable biodegradable polymer material.

With the inventive coextrusion of polylactide and the biodegradable polymer functioning as adhesion material on paper or paperboard are avoided the tearing of film occurring when extruding polylactide alone and the concomitant problems as the adhesion polymer acts as compounding element of the film. As the adhesive layer takes care of the problem presented by polylactide adherence the extrusion temperature may be lowered which in turn enhances the quality of the polylactide layer formed and diminishes the susceptibility of the material to tear and form pin holes when at the same time the polylactide layer may be made thinner than before. As a whole, the bilayered biodegradable polymer coating according to invention is more flexible and tighter than previous unilamellar polylactide coatings, in addition to which the amount of polymer in the polylactide layer or even in the coating as a whole can be diminished where by cost savings are produced.

It is preferred that the materials in the adhesive layer according to invention are biodegradable polyesters such as cellulose esters, aliphatic or aliphatic-aromatic co-polyesters or mixtures thereof. As cellulose esters may be mentioned cellulose acetate, propionate, butyrate, acetate-propionate, acetate-butyrate and propionate-butyrate. As copolyesters may be mentioned polyhydroxy alcanolates such as polyhydroxy butyrate, polyhydroxy valerate and polyhydroxy butyrate-polyhydroxy valerate copolymer. The mixtures mentioned are in particular binary or tertiary mixtures of cellulose esters and the copolyesters mentioned. Biodegradable adhesive polymers are described e.g. in U.S. Pat. Nos. 5,446,079; 5,580,911; 5,599,858; and 5,661,193, all of which are included hereby as references. As examples of products commercially useful may be mentioned cellulose acetate ester 14326 and copolyester 14766 manufactured by Eastman Chemical Company. Because of their strong adhesivity these polymers could not be extruded as such as a layer on a paper or paperboard surface where as their coextrusion with polylactide is extremely successful whereby the polylactide forms a surface on the coextruded film that as less adhesive can withstand contact with the rollers guiding the newly coated paper or paperboard conveyor belt. By using copolyesters, it has been possible to drop the extrusion temperature to about 200–240° C. which presents an essential advantage in regard not only to hindering the degradation of the polylactide but also as to avoiding the falty taste due to the packaging material of the food stuff. The total weight of the coating produced by coextrusion of copolyester and polylactide may according to preliminary tests be dropped to about 5–15 g/m² whereby the amount of polymer is of the same order of magnitude as in the previously knowm LD polyethylene coated paper and paperboard.

Even polyester amides such as polyester amides BAK 402-005 and BAK 2195 manufactured by Bayer are preferred biodegradable polymers well suited as components of the adhesive layer. Their adhesivity is that much lower that they can withstand the contact with rollers in the coating process. This makes possible the inventive application in which a trilayered polymer coating is produced on the cardboard that comprises the polylactide layer in between two adhesive layers. The advantages of this solution are presented as a smaller constriction of the coextruded polymer film, the ever lessened susceptibility of the coating to form pin holes and the improved heat sealability of the coated paperboard especially when adhering the polymer surface to the paperboard surface. The latter is caused by the polyester amide's stronger melt strength than that of the polylactide whereby it does not as easily penetrate the paperboard but remains at the intervening surface, forming an intact and durable seam.

Further, it is possible to enhance the aroma, oxygen and/or water vapour barring properties of the coated paperboard by introducing a biodegradable barrier polymer layer between the polylactide layer and the adhesive layer, such as PVA (polyvinyl alcohol) or PVA copolymer layer. As a result, one gets a trilayered structure composed of the polylactide, barrier polymer and the adhesive polymer, or a four-layered structure when even the polylactide and the barrier polymer require in order to attach an adhesive layer in between. In each and every case the coating may according to invention be formed by coextrusion of the layers.

According to one preferred embodiment of the invention, the compostable coating includes mixed in the polymer a finely divided mineral component. With a suitable mineral the barring properties of the polylactide layer can be profitably affected, in addition to which the mineral particles as substitutes for the polymer may speed up biological breakdown of the layer at the dumping site.

In particular, it is possible to precoat the paperboard with a polymer latex containing dispersed therein mineral particles whereby coextrusion of the adhesive polymer layer and polylactide layer is conducted on a dispersion precoated paperboard.

Depending on the intended use of the paper or paperboard, it may be provided with a polymer coating only on one side, or on both sides. The paperboard coated according to invention that is well suited for food stuff packaging and for disposable dishes or containers is preferably a trilayered paperboard whereby in the middle there is a thicker layer of a mixture of chemical mass and CTMNP on both sides of which are arranged thinner layers composed essentially of pure chemical mass.

The inventive method for producing compostable polymer coated paper or paperboard is characterized in that the outer layer containing polylactide and the adhesive layer composed of biodegradable polymer material are coextruded together on a moving paper or paperboard conveyor belt. As to the applications of the extrudable layers, we refer to the above description of the inventive paper or paperboard.

As products according to the invention that are formed of the coated paperboard described above may be mentioned especially: containers for frozen food, drinking cups or goblets and heat-sealed cartons that are packaged with essentially liquid food stuffs. In cups intended for hot drinks it is enough to have the water tight coating only on the inner surface of the cup. Contrary to this, in cups intended for cold drinks it is preferred that the coating be on both the inner and the outer surface of the cup whereby the carton is protected even from water condensing on the outer surface of the cup. In heat sealed cartons, at least the inner surface of the carton must be coated even if as to the heat sealability it is preferred that the sealable polymer coating be on both the inner and the outer surface of the container.

The inventive polymer coated paper is especially well suited as wrapping material for food stuffs. The polymer coating is most preferably on only the inner surface of this paper that touches the food stuff.

BRIEF DESCRIPTION OF THE DRAWINGS

Next, the invention is described more in detail with the following examples, referring to the appended drawings in which:

FIG. 5 is a container for frozen food manufactured of the paperboard according to FIG. 2 whereby FIG. 5a is a partial enlargement of the wall structure of the container;

FIG. 6 is a milk carton manufactured of the paperboard according to FIG. 2; and

FIG. 7 is section VII—VII of the carton according to FIG. 6 along the heat-sealed line.

In FIG. 1 can be seen the layered structure of the paperboard 1 according to the invention which is on one side provided with a compostable polymer coating. The fiber layers of the paperboard are in the figure marked commonly with the reference number 2 whereas the polymer coating is marked with the reference number 3. The fiber layers 2 are composed of a trilayered paperboard the thicker middle layer 4 of which is a mixture of sulfate mass and CTMP, while the outer layers 5 on both sides of the middle layer 4 are of sulfate mass. The middle layer 4 forms about 60% of the weight of the fiber layer 2 while each of the above mentioned sulfate mass layers 5 form about 20%. The total weight of the fiber layer 2 without coating layers may be about 200–400 g/m$^2$, e.g. about 225 g/m$^2$. The polymer coating 3 according to FIG. 1 is composed of an outer layer 6 which comprises polylactide and of an adhesive layer 7 which is coextruded with the former and is of biodegradable polymer and binds the polylactide layer onto the sulfate mass layer 5. According to the invention, the weight of the polylactide layer 6 is 20 g/m$^2$ at the most, while it is preferred that the total weight of the polymer coating 3 be about 30 g/m$^2$ at the most. When considering for instance production of drinking cups, it is preferred that the amount of polylactide be about 10 g/m$^2$ and that of the adhesive polymer 7, which is e.g. one of the aforementioned Eastman or Bayer products, be about 5 g/m$^2$.

Figure 1:
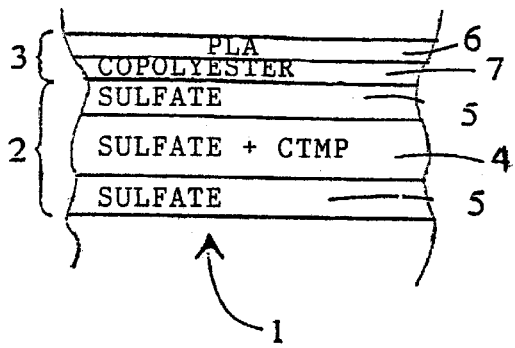
FIG. 1 is a schematical representation of a coated paperboard according to invention.
Figure 2:
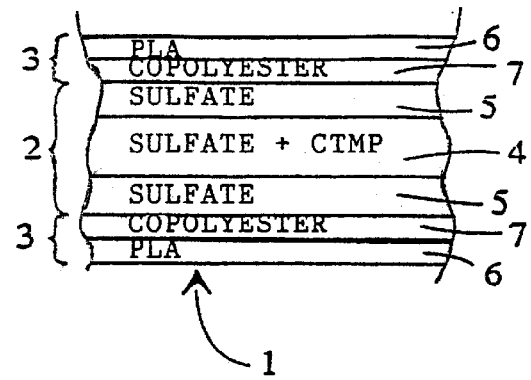
FIG. 2 is a schematical representation of another coated paperboard according to invention.

The coated paperboard 1 according to FIG. 2 is structurally similar to the one represented in FIG. 1 except that the paperboard (fiber layers 2) are on both sides provided with a compostable polymer coating 3. The fiber layers 2 are thus composed of a similar trilayered paperboard as in the application according to FIG. 1, and even the polymer coatings 3 on each side of the paperboard 1 may in relation to material and surface weight correspond to the one represented in FIG. 1, whereby the paperboard is well suited e.g. as material for drinking cups. However, in containers for frozen food the polymer coating layers 3 may be made even thinner, e.g. such that the amount of polylactide in each layer is about 5 g/m$^2$ and the amount of the polyester 7 underneath, functioning as adhesive material, is likewise about 5 g/m$^2$. In paperboard intended for heat-sealable cartons it is preferred that the polymer coating 3 be, on the contrary, somewhat thicker, as of a total surface weight of about 15–30 g/m$^2$.

Figure 3:
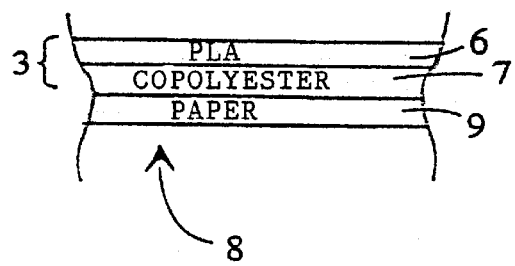
FIG. 3 is a schematical representation of a coated paper according to invention.

In the polymer coated paper 8 according to FIG. 3 the weight of the base paper 9 manufactured e.g. of sulfate mass may be 30–100 g/m$^2$. On one side of the paper is laminated by coextrusion adhesive polymer and polylactide layers 7, 6, on top of each other, in the same way as in the paperboard applications according to FIG. 1 and FIG. 2. The total weight of coating layers 3 may be 5–10 g/m$^2$. The polymer coated paper 8 according to FIG. 3 is as such well suited as wrapping material for food stuffs in that the polymer coating 3 coming into contact with the moist food stuff protects the paper from getting wet.

Figures 4, 4A:
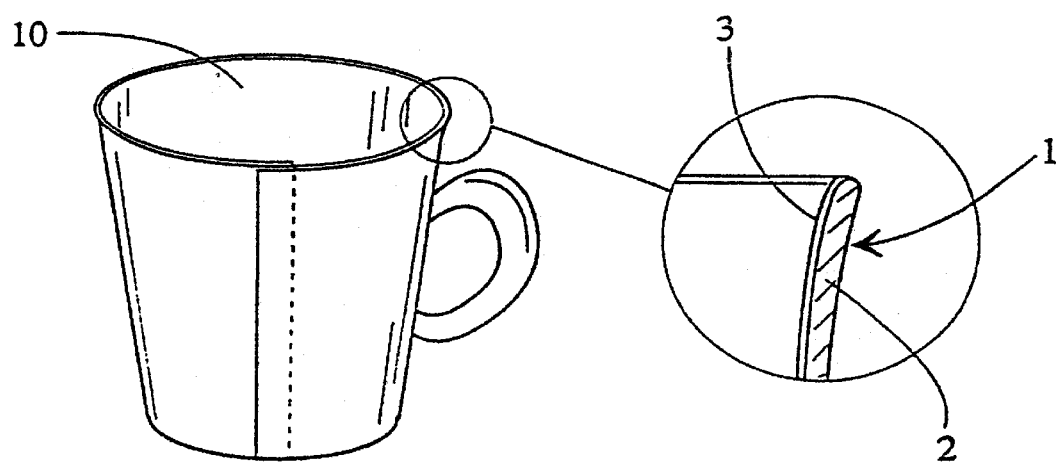
FIG. 4 is a drinking cup manufactured of the paperboard according to FIG. 1 whereby
FIG. 4a is a partial enlargement of the wall structure of the cup.

FIG. 4 represents a disposable heat-sealed drinking cup 10 which is made of the paperboard 1 according to FIG. 1 such that the polymer coating 3 is on the inner surface of the cup as represented in FIG. 4a. This cup 10 is well suited especially for coffee and other hot drinks that do not require a coating on the outer surface of the cup.

For refrigerated drinks the cup 10 according to FIG. 4 may be made of paperboard according to FIG. 2 whereby polymer coating 3 is applied to both the inner and outer surfaces of the cup which is necessary in order for the water condensing on the outer surface up the cup not to be adsorbed in the cup paperboard.

FIG. 5 represents a container for frozen foods 11 manufactured by creasing from the paperboard 1 according to FIG. 2. Both the inner and outer surfaces of the container 11 are thus provided with the compostable polymer coating 3. Because the container is not heat-sealed and because it need not be as tightly sealed as e.g. drinking cups or carton packages the coating layers of the container may be made thinner than in other products described herein.

In FIG. 6 and in FIG. 7 is represented a carton 12 which is a consumer package for liquid food stuffs such as milk, cream, buttermilk, yogurt, water, juice or wine. The carton 12 of the shape of an essentially right-angled prism is produced by heat-sealing from the paperboard 1 according to FIG. 2 coated on both sides. FIG. 7 is a cross-sectional view of the seam in carton 12 where the seam consists of opposing coating layers 3 heat-sealed to one another, especially of their outer, sealed together polylactide layers.

EXAMPLES

Example 1

On a trilayered cup paperboard that weighted 210 g/m$^2$ and the forward speed of which was 150 m/min, was coextruded copolyester 14766 (Eastar) and polylactide (PLA) in a weight ratio 1:3 with the temperature of the copolyester being 210° C. and that of the polylactide 240° C. A coated paperboard was obtained where the total weight of the polymeric coating was 19.4 g/m$^2$ of which the adhesive copolyester on the inner side formed 25% and the polylactide forming the outer layer 75%.

Example 2

The procedure was as in example 1 except that the forward speed of the paperboard conveyor belt was 292 m/min. A coated paperboard was obtained where the total weight of the polymeric coating was 12.4 g/m$^2$ of which the adhesive copolyester formed 25% and the polylactide 75%.

By further varying the speed of the paperboard conveyor belt coated paperboards were produced where the total weights of the polymeric coatings were 47.3 g/m$^2$, 33.3 g/m$^2$, 26.7 g/m$^2$, 25.0 g/m$^2$, 15.4 g/m$^2$, and 13.7 g/m$^2$, and the adhesive copolyester formed 25% and the polylactide 75%.

Example 3

On a trilayered cup paperboard that weighted 210 g/m$^2$ and the forward speed of which was 200 m/min, was coextruded copolyester 14766 and polylactide in a weight ratio 1:1 with the temperature of the copolyester being 210° C. and that of the polylactide 240° C. A coated paperboard was obtained where the total weight of the polymeric coating was 17.9 g/m$^2$ of which the adhesive copolyester on the inner side formed 50% and the polylactide forming the outer layer 50%.

Example 4

The procedure was as in example 3 except that the forward speed of the paperboard conveyor belt was 292 m/min. A coated paperboard was obtained where the total weight of the polymeric coating was 12.8 g/m$^2$ of which the adhesive copolyester formed 50% and the polylactide 50%.

By further varying the speed of the paperboard conveyor belt coated paperboards were produced where the total weights of the polymeric coatings were 51.1 g/m$^2$, 44.6 g/m$^2$, 35.7 g/m$^2$, 26.2 g/m$^2$, and 13.8 g/m$^2$, and the adhesive copolyester formed 50% and the polylactide 50%.

Example 5

On a trilayered cup paperboard that weighted 210 g/m$^2$ and the forward speed of which was 200 m/min, was coextruded copolyester 14766 and polylactide in a weight ratio 3:1 with the temperature of the copolyester being 210° C. and that of the polylactide 240° C. A coated paperboard was obtained where the total weight of the polymeric coating was 20.0 g/m$^2$ of which the adhesive copolyester on the inner side formed 75% and the polylactide forming the outer layer 25%.

Example 6

The procedure was as in example 5 except that the forward speed of the paperboard conveyor belt was 292 m/min. A coated paperboard was obtained where the total weight of the polymeric coating was 15.0 g/m$^2$ of which the adhesive copolyester formed 75% and the polylactide 25%.

By further varying the speed of the paperboard conveyor belt coated paperboards were produced where the total weights of the polymeric coatings were 39.7 g/m$^2$, 33.6 g/m$^2$, 26.0 g/m$^2$, and 17.0 g/m$^2$, and the adhesive copolyester formed 75% and the polylactide 25%.

Example 7

On a trilayered cup paperboard that weighted 210 g/m$^2$ was coextruded polyester amide BAK 402-005 and polylactide in a weight ratio 1:3 with the temperature of the polyester amide being 210° C. and that of the polylactide 240° C. By using varying conveyor belt speeds coated paperboards were obtained where the total weights of the polymeric coatings were 31.5 g/m$^2$, 25.7 g/m$^2$, 20.6 g/m$^2$, 13.2 g/m$^2$, 9.4 g/m$^2$, 8.6 g/m$^2$, and 6.6 g/m$^2$. In each case the adhesive polyester amide on the inner side formed 25% of the coating while the polylactide forming the outer layer formed 75%.

Comparative Material

The same cup paperboard as in examples 1–7 above was provided with coating layers of varying weights of polylactide (PLA) or of low density polyethylene (PE-LD) without the intervening adhesive layer. The extrusion temperature of the polylactide was 250° C.

Bending Experiments

Experiments were conducted with the polymer coated paperboards manufactured according to examples 1–7 and with comparative materials in order to enlighten the susceptibility of the coatings to cracking when bending or creasing the paperboard or to leaks due to cracking in finished products. The paperboards were bent (180°) in the direction of the machine (MD) such that the coating formed the outer surface of the fold (MD/S) or the inner surface (MD/C) or cross-directionally in relation to the machine (TD) such that the coating formed the outer surface of the fold (TD/S) or the inner surface (TD/C). The experiments were conducted at the temperatures of 2° C. and 23° C. In each case the experimental piece was bent on a 10 cm distance by drawing it through standard air gap rubber rollers. After this, the fold was opened and coloured turpentine was applied to the entire length of the fold. The result of the experiment was determined by measuring or evaluating the percentage from total fold length of leaks where the turpentine penetrated the coating. Zero result means thus that no leaks were detected. The results are represented in the following table 1.

| POLYMERS/ RATIOS, % | COATING SQ. WEIGHT g/m$^2$ | CRACKING 23° C. | | | | CRACKING 2° C. | | | |
| --- | --- | --- | --- | --- | --- | --- | --- | --- | --- |
| | | MD/C | MD/S | TD/C | TD/S | MD/C | MD/S | TD/C | TD/S |
| PLA/EASTAR 75/25 | 47.3 | 0 | 0 | 0 | 0 | 0 | 0 | 0 | 0 |
| PLA/EASTAR 75/25 | 33.3 | 0 | 0 | 0 | 0 | 0 | 0 | 0 | 0 |
| PLA/EASTAR 75/25 | 26.7 | 0 | 0 | 0 | 0 | 0 | 0 | 0 | 0 |
| PLA/EASTAR 75/25 | 25.0 | 0 | 0 | 0 | 0 | 0 | 0 | 0 | 1 |
| PLA/EASTAR 75/25 | 19.4 | 0 | 1 | 0 | 2 | 0 | 0 | 0 | 1 |
| PLA/EASTAR 75/25 | 15.4 | 0 | 3 | 0 | 7 | 0 | 4 | 0 | 4 |
| PLA/EASTAR 75/25 | 13.7 | 0 | 7 | 0 | 15 | 0 | 7 | 0 | 4 |
| PLA/EASTAR 75/25 | 12.4 | 0 | 9 | 0 | 15 | 0 | 11 | 1 | 9 |
| PLA/EASTAR 50/50 | 51.1 | 0 | 0 | 0 | 0 | 0 | 0 | 0 | 0 |
| PLA/EASTAR 50/50 | 44.6 | 0 | 0 | 0 | 0 | 0 | 0 | 0 | 0 |
| PLA/EASTAR 50/50 | 35.7 | 0 | 0 | 0 | 0 | 0 | 0 | 0 | 0 |
| PLA/EASTAR 50/50 | 26.2 | 0 | 0 | 0 | 0 | 0 | 0 | 0 | 0 |
| PLA/EASTAR 50/50 | 17.9 | 0 | 0 | 0 | 1 | 0 | 0 | 0 | 1 |
| PLA/EASTAR 50/50 | 13.8 | 0 | 1 | 0 | 2 | 0 | 0 | 0 | 1 |
| PLA/EASTAR 50/50 | 12.8 | 5 | 0 | 0 | 0 | 1 | 0 | 0 | 1 |
| PLA/EASTAR 25/75 | 39.7 | 0 | 0 | 0 | 0 | 0 | 0 | 0 | 0 |
| PLA/EASTAR 25/75 | 33.6 | 0 | 0 | 0 | 0 | 0 | 0 | 0 | 0 |
| PLA/EASTAR 25/75 | 26.0 | 0 | 0 | 0 | 0 | 0 | 0 | 0 | 0 |
| PLA/EASTAR 25/75 | 20.0 | 0 | 0 | 0 | 0 | 0 | 0 | 0 | 1 |
| PLA/EASTAR 25/75 | 17.0 | 0 | 0 | 0 | 2 | 0 | 2 | 0 | 1 |
| PLA/EASTAR 25/75 | 15.0 | 0 | 1 | 0 | 1 | 0 | 1 | 0 | 0 |
| PLA/BAK 75/25 | 20.6 | 0 | 0 | 0 | 2.4 | 0 | 0 | 0 | 0.4 |
| PLA/BAK 75/25 | 13.2 | 0 | 0 | 0 | 0.2 | 0 | 1 | 6 | 0 |
| PLA/BAK 75/25 | 8.6 | 0.6 | 1 | 1 | 3.4 | 2 | 5 | 14 | 3 |
| PLA/BAK 75/25 | 6.6 | 2.6 | 1.6 | 1 | 8.8 | 1 | 7 | 9 | 3 |
| PLA 100 | 46.3 | 1 | 2 | 15 | 16 | 2 | 6 | 1 | 3 |
| PLA 100 | 38.8 | 3 | 18 | 13 | 13 | 0 | 0 | 2 | 10 |

-continued

| POLYMERS/ RATIOS, % | COATING SQ. WEIGHT g/m² | CRACKING 23° C. | | | | CRACKING 2° C. | | | |
|---|---|---|---|---|---|---|---|---|---|
| | | MD/C | MD/S | TD/C | TD/S | MD/C | MD/S | TD/C | TD/S |
| PLA 100 | 33.0 | 2 | 5 | 14 | 9 | 1 | 15 | 0 | 5 |
| PLA 100 | 27.9 | 1 | 29 | 4 | 9 | 0 | 7 | 1 | 13 |
| PLA 100 | 20.7 | 4 | 22 | 2 | 25 | 0 | 35 | 6 | 12 |
| PLA 100 | 19.5 | 15 | 50 | 4 | 19 | 0 | 31 | 7 | 21 |
| PLA 100 | 15.2 | 12 | 30 | 11 | 20 | 28 | 39 | 36 | 47 |
| PE-LD 100 | 27.9 | 0 | 0 | 1 | 1 | 0 | 0 | 0 | 0 |
| PE-LD 100 | 16.9 | 0 | 0 | 2 | 5 | 0 | 0 | 0 | 1 |
| PE-LD 100 | 16.5 | 0 | 1 | 0 | 12 | 0 | 0 | 0 | 4 |
| PE-LD 100 | 8.2 | 0 | 0 | 0 | 30 | 0 | 0 | 0 | 8 |
| PE-LD 100 | 7.3 | 0 | 1 | 1 | 51 | 0 | 1 | 0 | 19 |
| PE-LD 100 | 6.6 | 0 | 6 | 0 | 59 | 0 | 9 | 0 | 15 |
| PE-LD 100 | 6.4 | 0 | 8 | 1 | 67 | 0 | 2 | 1 | 48 |

From the results may be seen that according to invention paperboards can be made in which the folds are essentially or even fully leak-proof when the weight of the coextruded polymer coating is of the order of about 12–15 g/m² or more. The results are as good as or even better than with the material of comparison, unbiodegradable low density polyethylene that is traditionally used for coating paperboard containers intended to hold liquids. Superiority to polylactide used without an adhesive layer is evident.

Adhesion

In extrusion coating of paperboard such adhesiveness is generally required of the coating that when trying to loosen the same the surface strength of the paperboard gives in, i.e. the paperboard becomes unlaminated. Is the adhesion too weak, no unlamination occurs but the coating peels loose from the paperboard surface. The force (N/m) required for the coating to peel off can then be determined. With the polymer coated paperboards produced according to examples 1–7 and with the materials for comparison experiments were conducted where the coating was peeled off the paperboard in order to determine the force required for peeling or unlamination of the paperboard. The results are presented in the following table 2.

ADHESION 210 g/m² ENSOCUP PAPERBOARD

| POLYMERS/RATIOS % | COATING SQ.WT g/m² | ADHESION N/m |
|---|---|---|
| PLA/EASTAR 75/25 | 47.3 | BECOMES UNLAMINATED |
| PLA/EASTAR 75/25 | 33.3 | BECOMES UNLAMINATED |
| PLA/EASTAR 75/25 | 26.7 | BECOMES UNLAMINATED |
| PLA/EASTAR 75/25 | 25.0 | BECOMES UNLAMINATED |
| PLA/EASTAR 75/25 | 19.4 | BECOMES UNLAMINATED |
| PLA/EASTAR 75/25 | 15.4 | BECOMES UNLAMINATED |
| PLA/EASTAR 75/25 | 13.7 | BECOMES UNLAMINATED |
| PLA/EASTAR 75/25 | 12.4 | 30.3 |
| PLA/EASTAR 50/50 | 51.1 | BECOMES UNLAMINATED |
| PLA/EASTAR 50/50 | 44.6 | BECOMES UNLAMINATED |
| PLA/EASTAR 50/50 | 35.7 | BECOMES UNLAMINATED |
| PLA/EASTAR 50/50 | 26.2 | BECOMES UNLAMINATED |
| PLA/EASTAR 50/50 | 17.9 | BECOMES UNLAMINATED |
| PLA/EASTAR 50/50 | 13.8 | BECOMES UNLAMINATED |
| PLA/EASTAR 50/50 | 12.8 | BECOMES UNLAMINATED |
| PLA/EASTAR 25/75 | 39.7 | BECOMES UNLAMINATED |
| PLA/EASTAR 25/75 | 33.6 | BECOMES UNLAMINATED |
| PLA/EASTAR 25/75 | 26.0 | BECOMES UNLAMINATED |
| PLA/EASTAR 25/75 | 20.0 | BECOMES UNLAMINATED |
| PLA/EASTAR 25/75 | 17.0 | BECOMES UNLAMINATED |
| PLA/EASTAR 25/75 | 15.0 | BECOMES UNLAMINATED |
| PLA/BAK 75/25 | 31.5 | BECOMES UNLAMINATED |
| PLA/BAK 75/25 | 25.7 | BECOMES UNLAMINATED |
| PLA/BAK 75/25 | 20.6 | BECOMES UNLAMINATED |
| PLA/BAK 75/25 | 17.3 | BECOMES UNLAMINATED |
| PLA/BAK 75/25 | 13.2 | 67 |
| PLA/BAK 75/25 | 9.4 | 27 |
| PLA/BAK 75/25 | 8.6 | 15 |
| PLA/BAK 75/25 | 6.6 | 10 |
| PLA 100 | 46.3 | BECOMES UNLAMINATED |
| PLA 100 | 38.8 | BECOMES UNLAMINATED |
| PLA 100 | 33.0 | 65 |
| PLA 100 | 27.9 | 70 |
| PLA 100 | 20.7 | 80 |
| PLA 100 | 19.5 | 29 |
| PLA 100 | 15.2 | 10 |
| PE-LD 100 | 27.9 | BECOMES UNLAMINATED |
| PE-LD 100 | 16.9 | BECOMES UNLAMINATED |
| PE-LD 100 | 16.5 | BECOMES UNLAMINATED |
| PE-LD 100 | 8.2 | BECOMES UNLAMINATED |
| PE-LD 100 | 7.3 | BECOMES UNLAMINATED |
| PE-LD 100 | 6.6 | BECOMES UNLAMINATED |
| PE-LD 100 | 6.4 | BECOMES UNLAMINATED |

From the results is seen that with paperboards according to invention the desired unlamination indicating sufficient adhesion occurs when the total weight of the coextruded polymer coating is of the order of about 15 g/m² or more. Superiority to polylactide used without an adhesive layer is evident. With low density polyethylene the unlamination was in fact reached with an even lower amount of coating but as has been stated, that polymer is not biodegradable.

Example 8

Grease Tolerance

For these tests, paper was coated according to invention with adhesive copolymer 14766 (Eastar) and polylactide (PLA) in weight ratio 1:1, the total weight of the coating being 12 g/m² or 19 g/m², and for comparison, with mere polylactide, without an adhesive layer, applying surface weights of 11 g/m² and 22 g/m², and with mere low density polyethylene, applying surface weights 7 g/m² and 17 g/m². The grease tolerances of the thus coated papers were determined from cross-creased test bodies using chicken grease and standard method ASTM F 119-82 at the temperature of 60° C. Each test was done twice. The results are presented in the following table 3.

| Polymers/ Surface Weight g/m² | Grease Tolerance |
| --- | --- |
| 1. PE-LD 7 | 22.5 h |
| 2. PE-LD 7 | >65 h |
| 2. PE-LD 17 | >60 h |
| 1. PE-LD 17 | the test failed |
| 1. PLA 11 | >65 h |
| 2. PLA 11 | >65 h |
| 1. PLA 22 | >65 h |
| 2. PLA 22 | >65 h |
| 1. PLA/EASTAR 12 | >65 h |
| 2. PLA/EASTAR 12 | >65 h |
| 1. PLA/EASTAR 19 | >65 h |
| 2. PLA/EASTAR 19 | >65 h |

The results show that during 65 hours the grease did not penetrate the paper coated according to the invention which result was as good as the one obtained with mere polylactide coating.

Example 9

Penetration of Water Vapour

A trilayered packaging paperboard (Enso Natura 300) was precoated with a polymer latex containing dispersed mineral and polymer particles such that the weight of the coating layer obtained was about 10 g/m². For this dispersion precoated paperboard was measured at the temperature of 23° C. and at relative humidity of 50% RH the penetration of water vapour of 12.2 g/m²/24 h. After this, copolyester 14766 (Eastar) and polylactide (PLA) at the weight ratio 1:1 were coextruded on the paperboard as a polymer coating the weight of which was 17.9 g/m². The penetration of water vapour into the paperboard sank thereby to the value of 10.8 g/m²/24 h.

For the one professional in this field, it is obvious that the various applications of the invention do not limit themselves to the examples presented above but may vary in the scope of following claims.

What is claimed is:

1. A compostable polymer coated paper or paperboard, wherein the coating comprises an outer layer containing polylactide having a weight of at most 20 g/m², and an adhesive inner layer of biodegradable polymer material coextruded with the polylactide, the inner layer binding the outer layer to the paper or paperboard with an adhesive strength sufficient to prevent peeling off of the coating, wherein the outer layer and the adhesive inner layer have a combined total weight of at most 30 g/m².

2. A polymer coated paper or paperboard according to claim 1, characterized in that the adhesive layer contains biodegradable polyester amide, cellulose ester or aliphatic or aliphatic-aromatic copolyester.

3. A polymer coated paper or paperboard according to claim 1, characterized in that the compostable coating contains finely divided mineral component mixed in the polymer.

4. A polymer coated paper or paperboard according to claim 1, characterized in that the compostable coating is only on one side of the paper or paperboard.

5. A cup for hot drinks, characterized in that it is made of polymer coated paperboard according to claim 4 such that the coating is situated on the inner surface of the cup.

6. A packaging wrap, characterized in that it comprises polymer coated paper, according to claim 4.

7. A polymer coated paperboard according to claim 1, characterized in that the compostable coating is provided on each side of the paperboard.

8. A cup or goblet for cold drinks, characterized in that it is made of polymer coated paperboard according to claim 7.

9. A polymer coated paperboard according to claim 1, characterized in that the paperboard comprises a trilayered structure where in the middle there is a thicker layer of a mixture of chemical mass and chemithermomechanical pulp (CTMP), on both sides of which said layer there are thinner layers of essentially pure chemical mass.

10. A method for producing a polymer coated paper or paperboard according to claim 1, characterized in that the polylactide containing outer layer and the adhesive layer of biodegradable polymer material are coextruded together onto a moving paper or paperboard conveyor belt.

11. A method according to claim 10, characterized in that the temperature of extrusion is 200–240° C.

12. A container for frozen food stuffs, characterized in that it is made of polymer coated paperboard according to claim 1.

13. A heat-sealed carton, characterized in that it is made of polymer coated, paperboard according to claim 1 such that at least the inner surface of the carton is provided with the coating.

14. A compostable polymer coated paper or paperboard according to claim 1, wherein the weight of the adhesive inner layer is at least 3.4 g/m².

15. A polymer coated paper or paperboard according to claim 1, characterized in that the total weight of the coating layers on top of each other is 5–15 g/m².

16. A compostable polymer coated paper or paperboard, wherein the coating comprises an outer layer containing polylactide having a weight of at most 20 g/m², and an adhesive inner layer of biodegradable polymer material coextruded with the polylactide, the inner layer binding the outer layer to the paper or paperboard with an adhesive strength sufficient to prevent peeling off of the coating, wherein the adhesive layer contains biodegradable polyester amide, cellulose ester or aliphatic or aliphatic-aromatic copolyester.

* * * * *